United States Patent [19]
Coiro, Sr. et al.

[11] Patent Number: 5,385,118
[45] Date of Patent: Jan. 31, 1995

[54] ASSEMBLY FOR ANIMALS WITH POSITIVE DISCONNECT FROM A WATERING SYSTEM

[75] Inventors: Michael A. Coiro, Sr., Jacobstown; Dale R. Murray, Burlington Township, Burlington County, both of N.J.

[73] Assignee: Allentown Caging Equipment Co., Inc., Allentown, N.J.

[21] Appl. No.: 173,402

[22] Filed: Dec. 21, 1993

[51] Int. Cl.⁶ .............................................. A01K 31/00
[52] U.S. Cl. .................................................... 119/18
[58] Field of Search ........................ 119/15, 17, 18, 19

[56] References Cited

U.S. PATENT DOCUMENTS

| | | |
|---|---|---|
| 4,284,036 | 8/1981 | Hostetler . |
| 4,343,261 | 8/1982 | Thomas . |
| 4,365,590 | 12/1982 | Ruggieri et al. . |
| 4,402,280 | 9/1983 | Thomas . |
| 4,593,650 | 6/1986 | Lattuada ............................ 119/17 |
| 4,881,569 | 11/1989 | Fournier et al. . |
| 5,000,120 | 3/1991 | Coiro, Sr. et al. . |
| 5,042,429 | 8/1991 | Deitrich et al. . |
| 5,148,766 | 9/1992 | Coiro, Sr. et al. ..................... 119/17 |

Primary Examiner—Paul J. Hirsch
Assistant Examiner—Thomas Price
Attorney, Agent, or Firm—Mathews, Woodbridge & Collins

[57] ABSTRACT

A water quick disconnect assembly for improving removal of cages from an outside water supply. The assembly automatically turns off a water supply and disconnects a cage from a cage rack system. A water line connector attaches to an outside water supply. A water valve positioned within a cage barrier is locked to the water line connector when water is supplied to the cage. A linking member pivotally attaches to the water line for closing the water line. A knob assembly attaches the linking member to a pull cable. When the pull cable is pulled away from the cage, the water line connector is pivoted in a clockwise direction for disconnecting the water supply to the cage. The knob assembly provides positive visual indication of whether the cage is connected to the water supply or disengaged from the water supply. The quick disconnect system is a positive unlocking system.

13 Claims, 9 Drawing Sheets

ASSEMBLY FOR ANIMALS WITH POSITIVE DISCONNECT FROM A WATERING SYSTEM

BACKGROUND OF THE INVENTION

1. Field of the Invention

This invention relates to an isolated animal caging system for improving disconnection of individual cages having an internal watering valve from a watering system.

2. Background of the Invention

Prior art animal housing systems include a rack system with multi-compartment cages for housing individual animals. It is desirable to remove the cages from the rack for supplying animals with basic needs such as food, providing treatments to the animals and cleaning the inside of the cages.

U.S. Pat. No. 4,343,261 describes a cage rack in which individual cages can be withdrawn, serviced and reinserted. A shelf flange includes a flat area at one end of the rack and a sloping area rearward of the flat area. A cage flange includes a thicker flat central area and progressively thinner end portions. The cage flange is slidably inserted into the shelf flange so that upon full insertion into the rack the cage flange is firmly urged against the shelf flange. A water bottle is placed inside the cage. This rack has the disadvantage that the cage must be removed from the rack to replenish the water supply in the water bottle.

U.S. Pat. No. 4,402,280 describes a caging system providing convenience of installation or removal of individual cage assemblies. A plurality of cage assemblies are slidably disposed on flanges depending from shelves in a cage rack. A plurality of cage assembly covers have openings aligned with openings of ducts to an air supply. A spring-loaded sliding valve member connected to the cage has tabs to normally block the openings in the cage covers when the cage is removed from the cage rack. As the cage is pushed to full insertion, the tabs are slid open for receiving the air supply. Thus, air openings of the cage are closed off by the tabs unless the cage is fully inserted into the rack. A water bottle and food access depressed area can be supported on a removable lid of the cage. The cage assembly must be removed from the system to add water to the water bottle.

U.S. Pat. No. 4,699,088 issued to the same inventors of this disclosure describes a cage assembly including a water apparatus for allowing confined animals to be supplied with water from an outside watering system. The water apparatus allows the cage assembly to be disconnected from and reconnected to an outside watering system without destroying the integrity of the biologically micro-isolated cage from the environment. A watering valve is inserted into the water apparatus through a releasable entrance which seals the cage when the cage assembly is disconnected from the outside watering source. A perforation in a wall of the water apparatus is used for removing any water from the water apparatus that may have leaked from the watering source in order to prevent flooding of the cage or injury to the confined animals. However, this cage assembly suffers from the drawback that the valve is exposed to the ambient air and subject to possible contamination when the cage is not in place.

Of possible general relevance are U.S. Pat. No. 4,881,569 related to a coupling for a drinking water supply, U.S. Pat. No. 5,042,429 related to a coupling for connecting a water manifold with a drinking valve; and U.S. Pat. No. 4,284,036 related to a valved discharge member for use with a water supply system.

It is desirable to provide a positive locking connection to an outside water supply system that can be quickly and easily disconnected from a cage. The positive locking connection includes a valve located internally in the cage to maintain isolation barrier of the cage when the cage is disconnected from the outside watering supply system.

SUMMARY OF THE INVENTION

Briefly described the present invention comprises an animal cage rack system positively connected to an outside water supply. Cages can be inserted and removed from the rack and outside water supply system while maintaining a microbarrier condition within the cage. Water is supplied from the outside water supply system to a fixed water valve attached internally in the cage. The water valve is permanently attached to the cage and has an exterior coupling. A water supply connection on the watering manifold attaches the outside water supply system to the water valve exterior coupling for delivering water to the water valve while maintaining a barrier condition. An air inlet line is also received in an air coupling member for expelling air into the cage.

A quick disconnect assembly includes a pull cable and a knob assembly. A linking member is pivotally attached to the water supply connection of the outside water supply system. The pull cable is coupled to the linking member. As the knob assembly is moved forward away from the cage, the linking member pivots and disengages the water supply from the cage.

In a preferred embodiment, the knob assembly includes an inner button portion and an outer knob portion. The inner button portion extends from the outer knob portion when the cage is disengaged from the water supply. The inner button portion is flush against the outer knob portion when the cage is connected to the water supply. The extended inner button portion of the assembly provides a quick visual indication of whether or not the cage is positively connected to the water supply system.

These and other features of the invention can be further understood with reference to the following drawings.

DETAILED DESCRIPTION OF THE INVENTION

During the course of this description like numbers will be used to identify like elements according to the different figures which illustrate the invention.

Figure 1:
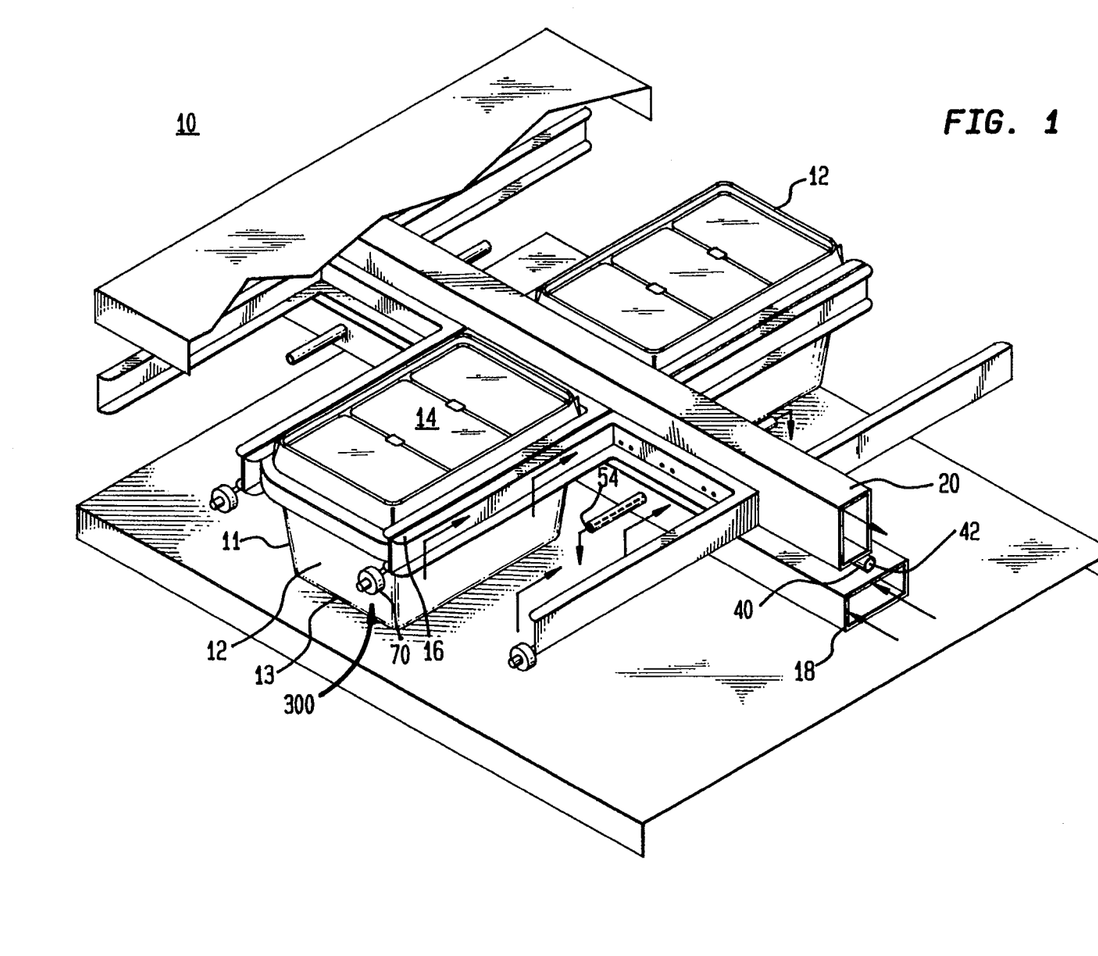
FIG. 1 is an isometric partial view of the cage rack assembly of the present invention illustrating individual cages received in shelves of a rack.

FIG. 1 is an isometric view of cage rack assembly 10 in accordance with the teachings of the present invention. Cage 12 is defined by bottom 13 and includes walls 11. Walls 11 support top 14 at the periphery thereof. Cage 12 slides into engagement with cage exhaust guide collar 16. Cage 12 is generally similar to those described in U.S. Pat. Nos. 5,000,102 and 5,148,766, hereby incorporated by reference into this application. An air inlet manifold 18 supplies air to cage 12. An air exhaust manifold 20 receives exhaust air from cage 12, as described in U.S. Pat. No. 5,148,766.

Fresh water is supplied to an animal in cage 12 through an outside water supply system 40. Water supply system 40 supplies multiple cages 12 with water. Water supply system 40 includes water supply line 42. Preferably, water supply line 42 is mounted above air inlet manifold 18. It will be appreciated that other arrangements for the positioning of water supply 42 line could be used in accordance with the teachings of the present invention. Water manifold quick disconnect assembly 30 including knob assembly 300 is used to disconnect water line 42 and air inlet manifold 18 from cage 12.

Figure 2:
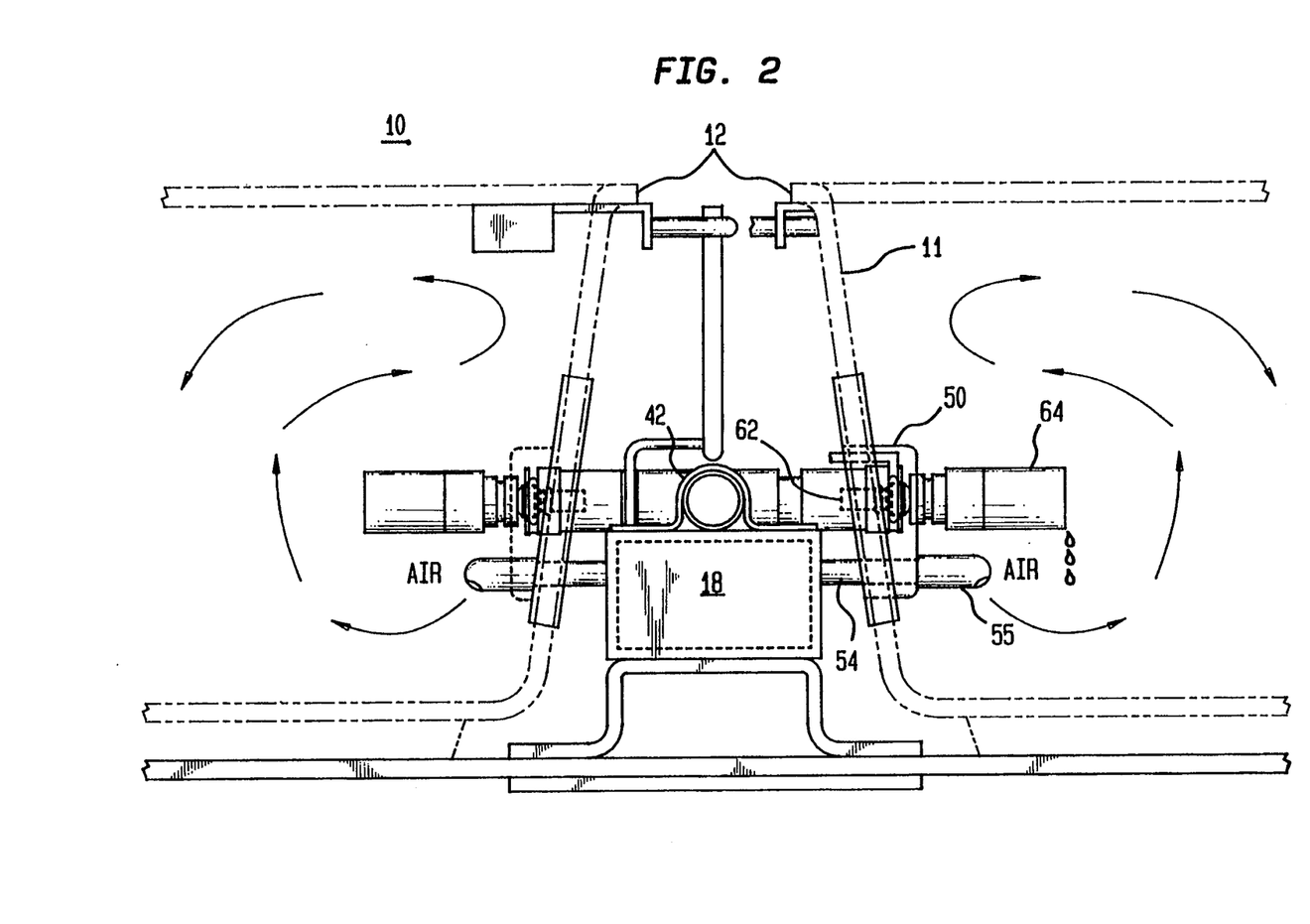
FIG. 2 is a side cross sectional view of the cage system including a water supply and an air supply.

FIG. 2 illustrates a side elevational view of cage rack assembly 10 including an internal coupling 50 attached to wall 11 of cage 12. Air is introduced into cage 12 through air inlet line 54. Air inlet line 54 is attached to air inlet manifold 18. Nozzle 55 is attached to internal coupling 50. When air is supplied to the cage, air inlet line 54 is positioned into nozzle 55. Water line connector 62 is connected to water line 42. Water line connector 62 attaches to water valve assembly 64 when cage 12 is slid to the rear end of cage exhaust guide collar 16 for supplying water to cage 12. Water valve assembly 64 is attached to internal coupling 50 and extends from internal coupling 50 into cage 12. Water valve assembly 64 extends beyond nozzle 55 into cage 12 for improved access to water valve assembly 64. Water valve assembly 64 is permanently attached to cage 12 to maintain barrier condition within cage 12.

Figure 3A:
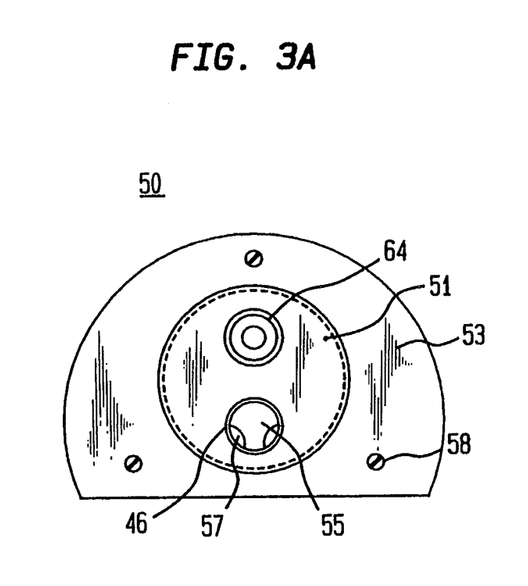
FIG. 3A is a front view of a coupling attached to the cage showing the water supply and air supply to the inside of the cage.
Figure 3B:
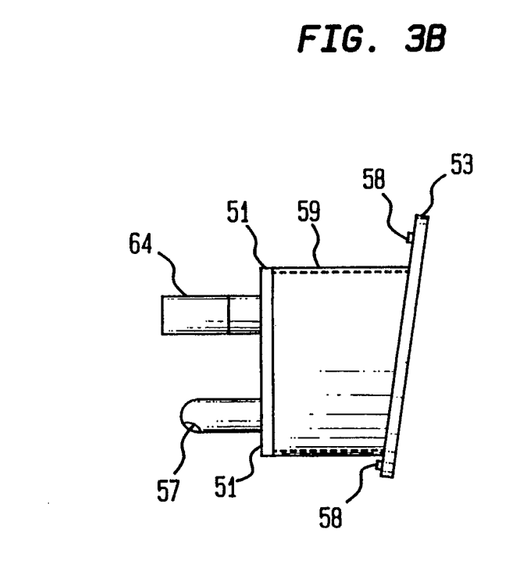
FIG. 3B is a side view of the coupling shown in FIG. 3A attached to the cage.

FIG. 3A illustrates internal coupling 50 which includes cover portion 51. Water valve assembly 64 extends from cover portion 51. Nozzle 55 extends through aperture 46 of cover portion 51. Openings 57 are formed in nozzle 55 for releasing air into cage 12. Cover portion 51 is attached to body portion 59 of coupling 50, as shown in FIG. 3B. Body portion 59 has one end attached to upper portion 51 and the other end attached to cage mounting portion 53. Cover portion 51 and body portion 59 can be welded together. Screws 58 can be used to attach cage mounting portion 53 to wall 11. In an alternate embodiment, cover portion 51, body portion 59 and cage mounting portion 53 are formed integrally.

Figure 4:
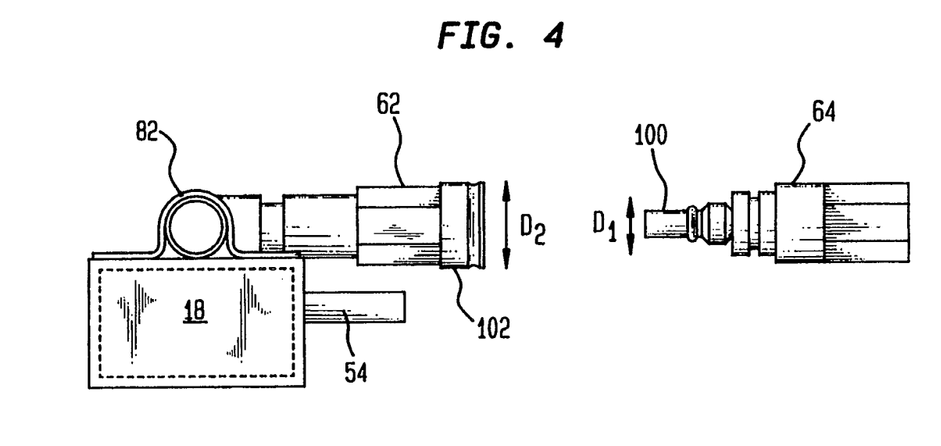
FIG. 4 is an exploded view of a water valve assembly and a water line connector used in the present invention.

FIG. 4 illustrates a side view of water line connector 62 and water valve assembly 64. Male end 100 of water valve assembly 64 has diameter $D_1$ which is preferably smaller than diameter $D_2$ of female end 102 of water line connector 62. During coupling, male end 100 engages female end 102 and allows water to flow from water supply line 42 to water valve assembly 64. Once male end 100 is inserted into female end 102 water valve assembly 64 and water line connector 62 are positively locked.

Figure 5:
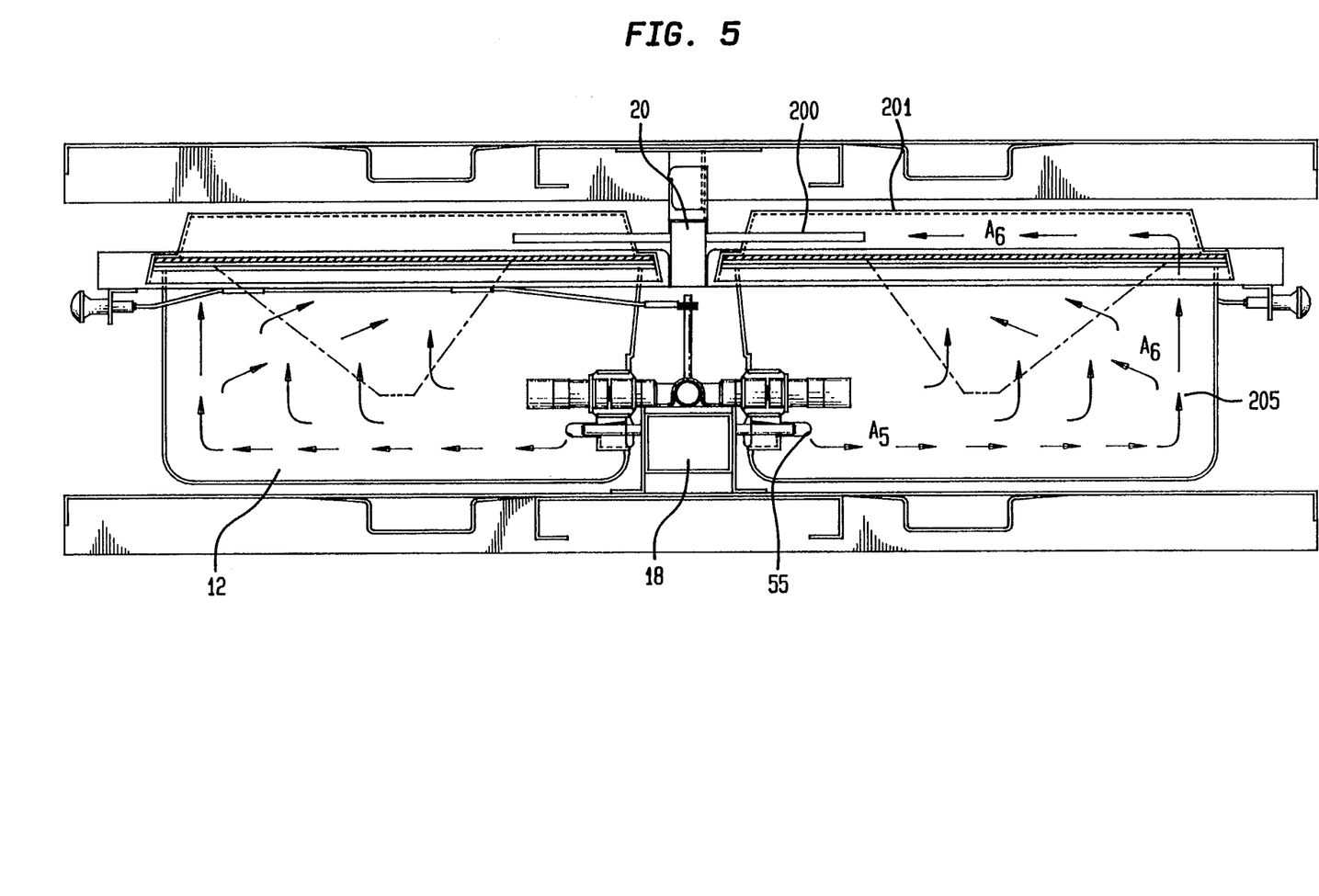
FIG. 5 is a side elevational view of an alternative embodiment of the air system of the present invention.

In an alternate embodiment illustrated in FIG. 5, air is removed from cage 12 through air exhaust tube 200 into air exhaust manifold 20. Air is supplied from air inlet manifold 18 through nozzle 55 into cage 12 in the direction of arrow $A_5$. Vapors 205 flow upwardly in the direction of arrow $A_6$ to air exhaust tube 200.

Figure 6A:
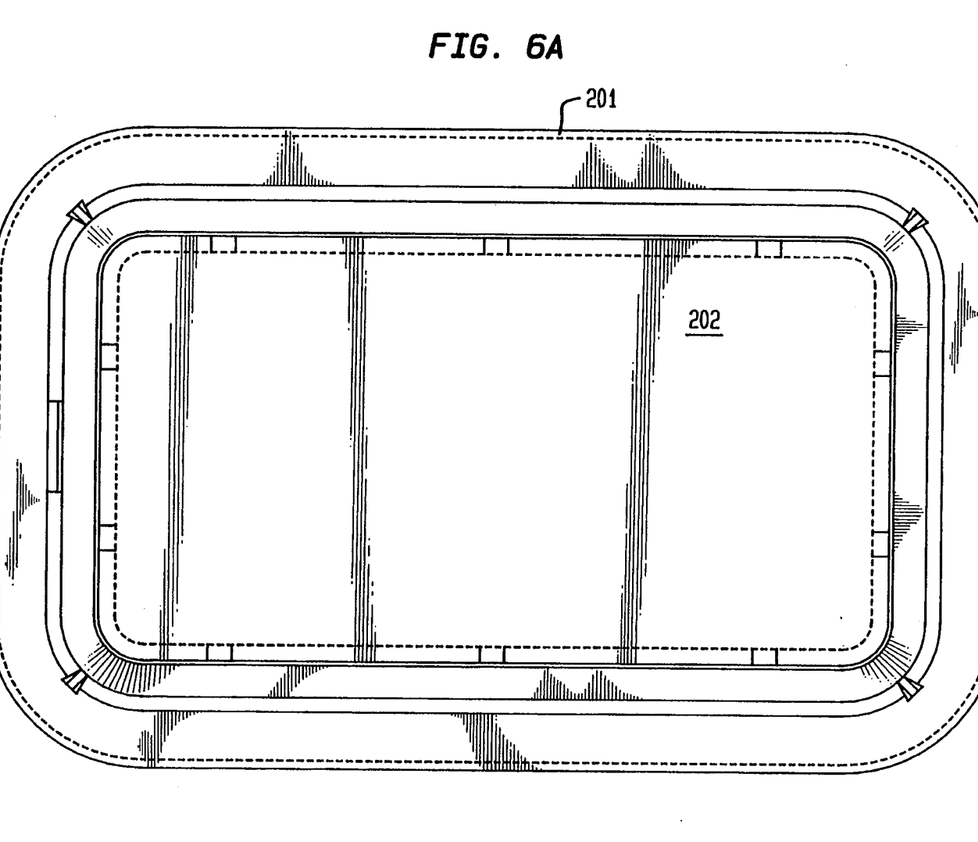
FIG. 6A is a top view of a cage top used in the air system shown in FIG. 5.
Figure 6B:
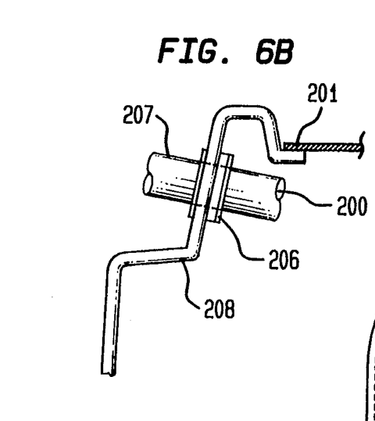
FIG. 6B is a cross sectional view of the side of the cage top shown in FIG. 6A.

FIG. 6A is a top view of cage top 201 used in the embodiment shown in FIG. 5. Top section 202 of cage top 201 is formed of a solid surface. Vapors 205 are prevented from escaping cage 12 by top section 202. FIG. 6B is a cross-sectional view along line A—A of FIG. 6A of cage top 201. End 207 of air exhaust tube 200 extends through aperture 206. Aperture 206 is positioned in a side section 208 of cage top 201. End 207 of air exhaust tube 200 is coupled to air exhaust manifold 20. Vapors 205 are withdrawn from exhaust manifold 20 as previously described. In the event of a failure of air inlet manifold 18, it has been found that animals can survive in cage 12 with solid top section 202 for at least 5 days.

Figures 7A, 7B:
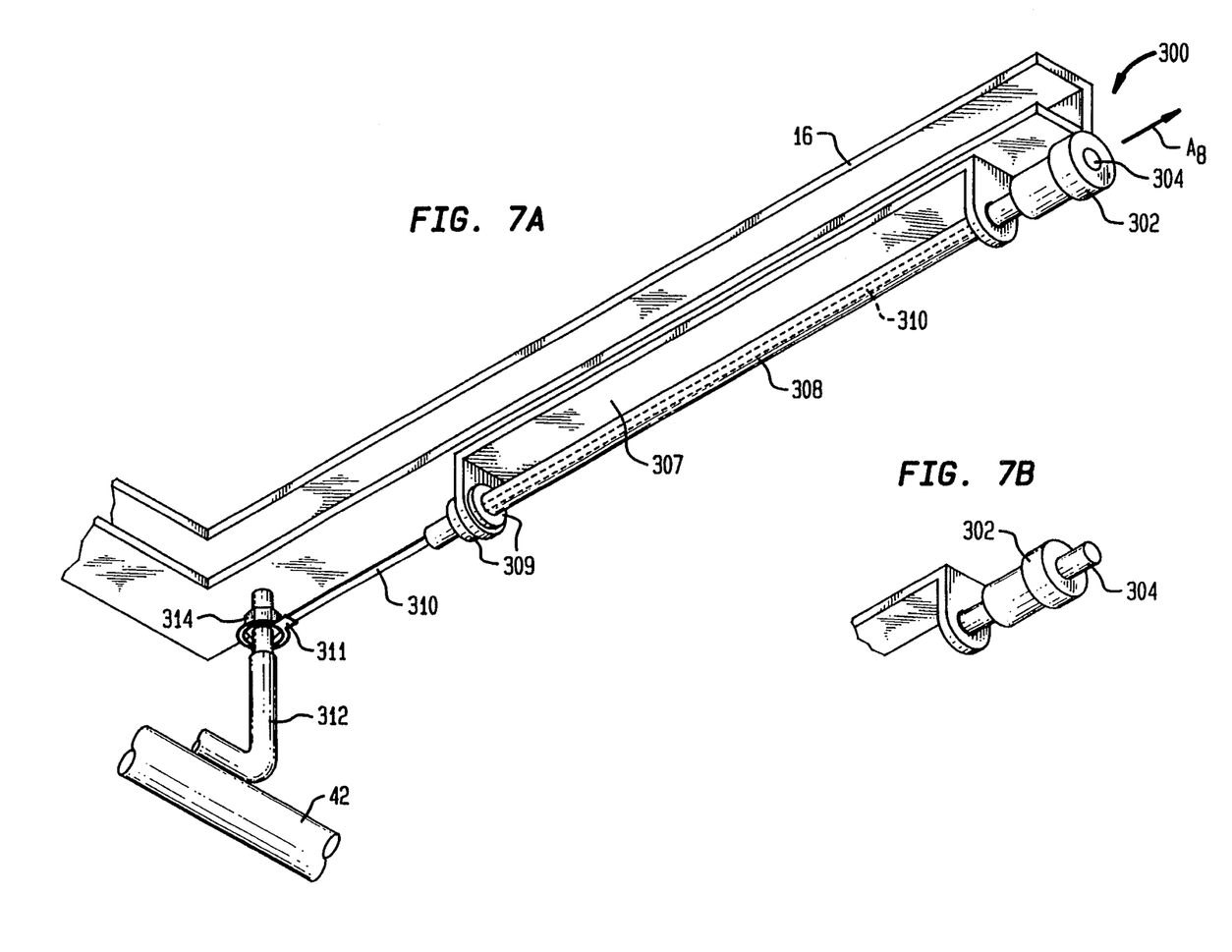
FIG. 7A is a side elevational view of the quick water manifold disconnect assembly and knob assembly including a knob assembly in the locked position.
FIG. 7B is a side elevational view of the knob assembly in the unlocked position.
Figure 7C:
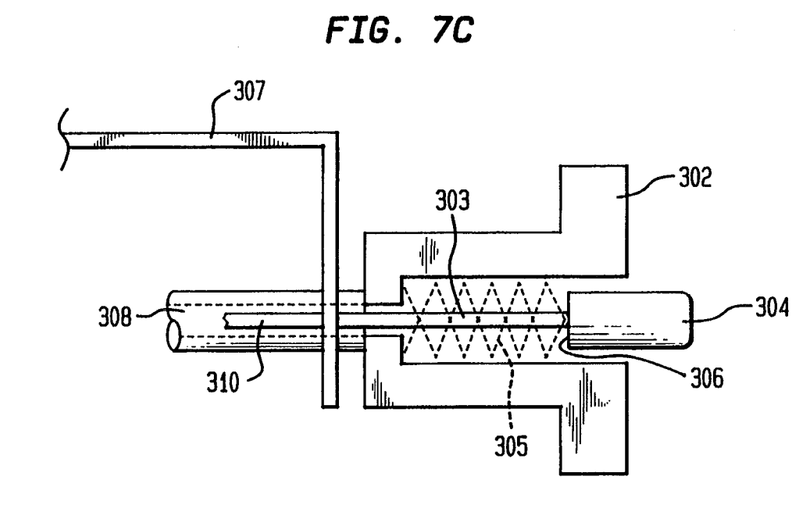
FIG. 7C is a cross sectional view of the knob assembly in the unlocked position.

FIG. 7A–7C illustrate water manifold quick disconnect assembly 30. Knob assembly 300 includes outer knob section 302 and inner button section 304. Hollow space 303 is formed in outer section 302. Inner button section 304 is positioned within hollow space 303. Spring 305 is positioned in hollow space 303 and contacts end 306 of inner button section 304. Guide tube 308 is coupled to bracket leg section 307. Guide tube 308 can be adjustable.

Bracket 307 attaches guide tube 308 to cage exhaust collar 16. Nuts 309 couple guide tube 308 to bracket 307. Nuts 309 adjust guide tube 308 so that inner button section 304 is flush against outer knob section 302 in the locked position, as shown in FIG. 8A.

Pull cable 310 couples inner button section 304 to linking member 312. Cable 310 includes a loop end 311 which surrounds linking member 312. Loop end 311 is attached to linking member 312 with lock nut 314. Button assembly 300 is pulled away from cage 12 to disengage cage 12 from water supply line 42. Knob assembly 300 is pulled in the direction of arrow $A_8$ to disconnect water supply line 42 from water valve assembly 64. When cage 12 is disengaged from water supply line 42, inner button section 304 extends from outer knob section 302 visually indicating that the cage is unlocked from water supply line 42, as shown in FIG. 8B. When pull cable 310 is pulled in the direction $A_8$, spring 305 extends inner button section 304 from outer knob section 302. Preferably, inner button section 304 is formed of metal or colored plastic and differs in color of outer knob section 302 for visibility.

Figure 8A:
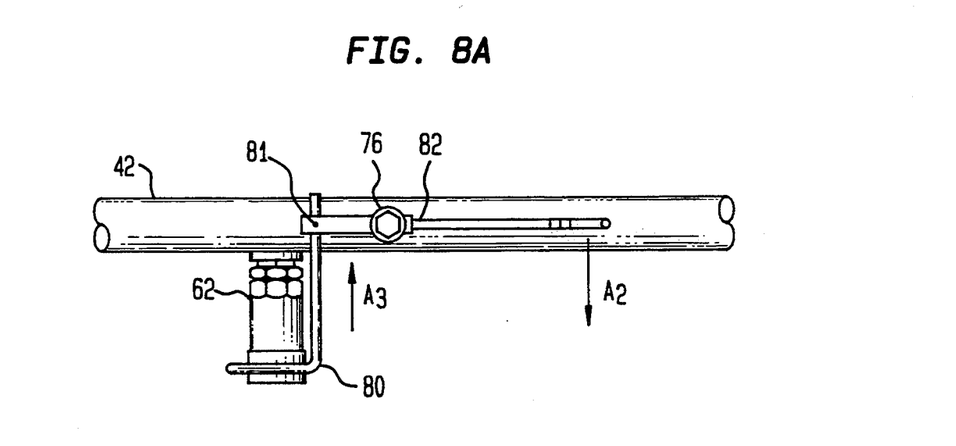
FIG. 8A is a top plan view of the water manifold quick disconnect assembly.
Figure 8B:
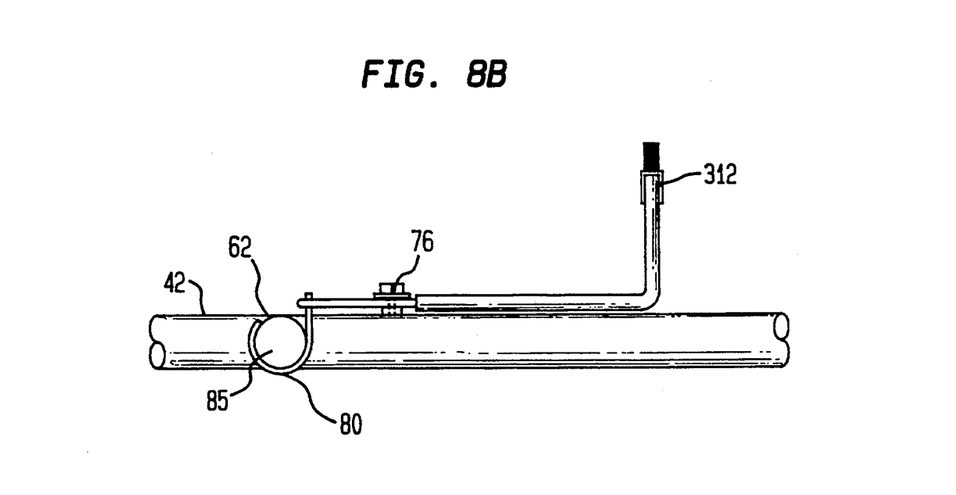
FIG. 8B is a front elevational view of the water manifold quick disconnect assembly.

When water supply line 42 is connected to water valve assembly 64 inner button section 304 is flush against outer knob section 302, as shown in FIG. 8A. Spring 305 is compressed within hollow space 303 when water supply line 42 is connected to water valve assembly 64. The flush position of inner button section 304 and outer knob section 302 visually indicates that water valve assembly 64 is positively attached to water line 42.

FIG. 8A and FIG. 8B are respective top and front views of linking member 82 coupled to water line connector 62 and linking member 312. Pivot 76 connects water linking member 82 to water supply line 42. Spring wire 80 is received in aperture 81 of water linking member 82. Spring wire 80 surrounds the front bottom portion 85 of water line connector 62. During disconnection of water line connector 62 from water valve assembly 64, water linking member 82 pivots around pivot 76 to pull spring wire 80 in the direction of arrow $A_3$. The action of spring wire 80 disconnects water line connector 62 from water valve assembly 64. After water valve assembly 64 is disconnected from water line connector 62, then water does not flow from water supply line 42 to water valve assembly 64 in cage 12.

The present invention has the advantage of providing a disconnect of a water valve assembly positioned inside a cage from an outside water supply system. The positioning of the water valve inside the cage maintains the cage in a barrier condition. A knob assembly is pulled away from the cage to disengage the internal cage water valve from a water supply line and to turn off the water supply, allowing the drinking valve to remain inside the cage and maintain a barrier condition. A pull cable connects the knob assembly by a linking member to the water supply. The knob assembly has the advantage of visually indicating that the cages are positively connected to the water line so that the operator can quickly visually determine the animals have access to water. The present invention is a positive disconnection assembly so that a cage can only be removed from the rack if positive action is taken by pulling a knob away from the cage.

While the invention has been described with reference to the preferred embodiment thereof, it will be appreciated by those of ordinary skill in the art that modifications can be made to the structure and form of the invention without departing from the spirit and scope thereof.

We claim:

1. A water disconnect assembly for an animal cage rack system, said cage rack system including a cage having at least one wall and an aperture in said at least one wall, said system comprising:
   removable water supply means coupled to an inner surface of said wall of said cage for supplying water to said animal; and
   positive disconnect means for disconnecting said cage from said water supply means,
   wherein a barrier condition is maintained in said cage after disconnection of said cage from said water supply.

2. The assembly of claim 1 wherein said water supply means includes a water line connector attached to a water supply line and a water valve attached to the inner surface of said wall of said cage.

3. The assembly of claim 2 wherein said disconnect means includes:
   knob means for activating said disconnect means;
   pull cable means having a first end coupled to said knob means and a second end coupled to said water line connector, wherein said knob means is pulled way from said cage and said pull cable means pivots said water line connector for disconnecting said water valve from said water supply line.

4. The assembly of claim 3 wherein said knob means comprises:
   an outer knob section having a hollow opening therethrough; and
   an inner button section positioned within said opening, said inner button section being coupled to said pull cable means,
   wherein when said cage is connected to said water supply means said outer knob section is flush against said inner button section and when said cage is disconnected from said water supply means said inner button section extends from said outer knob section for providing a positive visual indication of connection of said water valve to said water supply line.

5. The assembly of claim 4 wherein a spring biases said inner button section within said outer knob section, said spring extending said inner button section from said outer knob section when said cage is disconnected from said water supply means.

6. The assembly of claim 5 further comprising:
   a spring wire having first and second ends, said first end surrounding said water line connector and said second end coupled to said linking member.

7. The assembly of claim 6 wherein said linking member includes a first and second portion and a pivot, said pivot connecting said first portion of said linking member to said second portion of said linking member.

8. The system of claim 7 wherein said disconnect means quickly disconnects said cage from said water supply means.

9. The assembly of claim 8 further comprising:
   an air inlet manifold,
   an air inlet line coupled to said air inlet manifold; and
   a nozzle extending into said cage, said air inlet line being positioned into said nozzle when said cage is connected to said water supply line.

10. The assembly of claim 9, wherein said wall has an inside surface and an outside surface and further comprising
    an internal coupling mounted on said inside surface of said wall, said internal coupling connected to said water valve and said nozzle.

11. The assembly of claim 10 further comprising:
    an air exhaust manifold;
    a top section coupled to said cage, said top section having a solid upper surface; and
    an exhaust tube coupled to said top section and said air exhaust manifold, said air exhaust manifold removing air from said cage through said exhaust tube.

12. An animal cage apparatus for use in a rack having an air supply manifold and an air exhaust manifold, said apparatus comprising:
    a top section means for receiving air from said air supply manifold, said top section having a solid upper surface;
    a bottom section means for supporting said top section means, said bottom section means having a periphery and said top section being supported on said periphery of said bottom section means; and
    an exhaust tube coupled to said top section means and said air exhaust manifold, said air exhaust manifold removing air from said cage through said exhaust tube.

13. The apparatus of claim 12 further comprising:
    an aperture positioned in said top section means, wherein said exhaust tube extends through said aperture.

* * * * *